United States Patent [19]

Sekino et al.

[11] Patent Number: 4,582,332
[45] Date of Patent: Apr. 15, 1986

[54] SPRING CHUCK

[75] Inventors: Toyokichi Sekino, Tokyo; Eiichi Kimishima, Kanagawa; Hikaru Furukawa, Tokyo, all of Japan

[73] Assignee: Osada Electric Co., Ltd., Tokyo, Japan

[21] Appl. No.: 645,500

[22] Filed: Aug. 29, 1984

[30] Foreign Application Priority Data

Oct. 24, 1983 [JP] Japan .................................. 58-197572

[51] Int. Cl.⁴ ............................................. B23B 31/04
[52] U.S. Cl. ..................................... 279/23 R; 279/47
[58] Field of Search ..................................... 279/23, 46

[56] References Cited

U.S. PATENT DOCUMENTS

| | | | |
|---|---|---|---|
| 414,078 | 10/1889 | Rehfuss | 279/46 |
| 610,483 | 9/1898 | Fritz | 279/46 |
| 2,570,570 | 10/1951 | Lee | 279/23 |
| 3,794,335 | 2/1974 | Thackston | 279/23 |
| 3,967,831 | 7/1976 | Chang | 279/23 |

FOREIGN PATENT DOCUMENTS 476096 10/1975 U.S.S.R. .................................. 279/23

Primary Examiner—Jimmy C. Peters
Attorney, Agent, or Firm—Burgess, Ryan & Wayne

[57] ABSTRACT

A spring chuck has a clamp member opening mechanism comprising a guide groove formed in a rotating shaft and inclined in one direction, a guide groove formed on a wall surface of a bar stopper and inclined in the other direction opposite to the one direction, a push member, a holding hole formed in the push member, and a ball held in the holding hole in the push member, one projection of which is engaged with the guide groove in the rotating shaft and the other projection of which is engaged with the guide groove in the bar stopper. When the push member is moved downward, the rotating shaft and the bar stopper are rotated in opposite directions, and the relative rotation between the rotating shaft and the bar stopper becomes a sum of rotational angles of the rotating shaft and the bar stopper. A displacement of an upper cover and the push member becomes small, so that the clamp member opening mechanism can be held in a head case.

5 Claims, 5 Drawing Figures

FIG. 2
FIG. 3
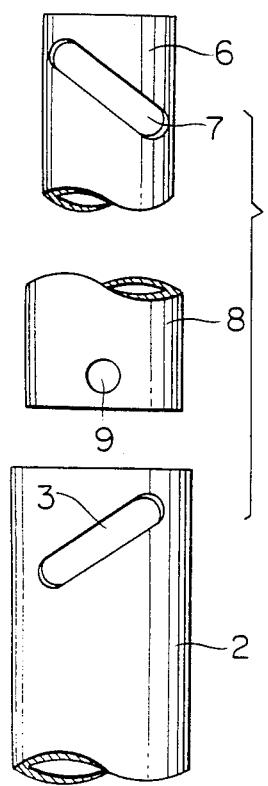
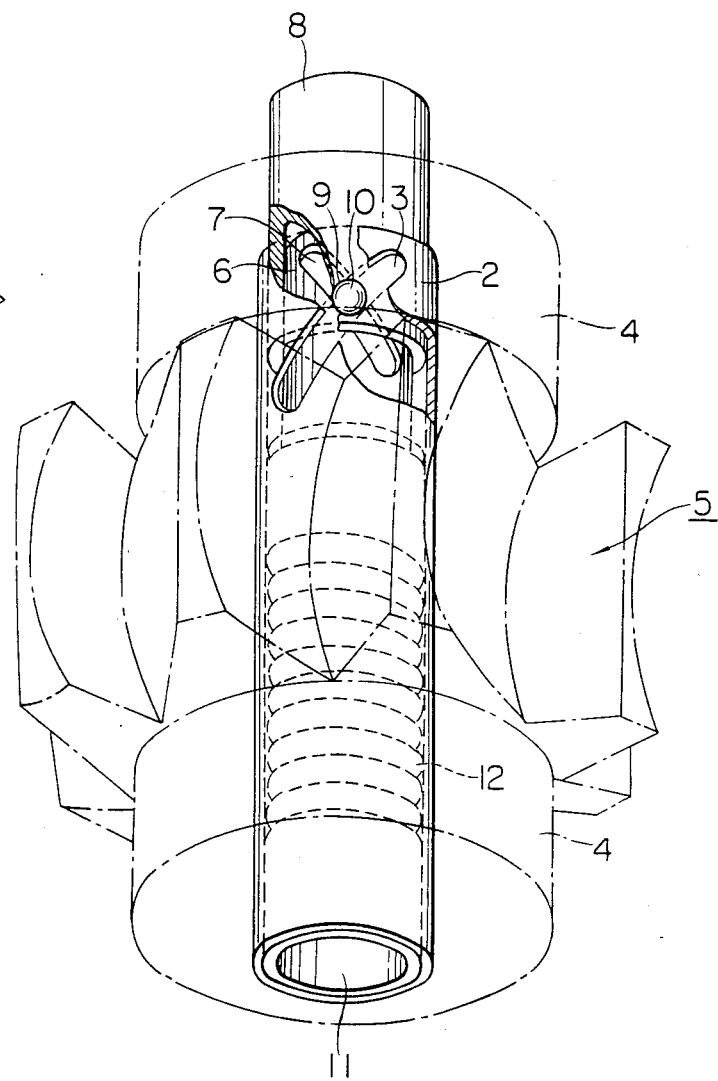

SPRING CHUCK

BACKGROUND OF THE INVENTION

The present invention relates to a spring chuck built in a head case at a front end portion of a handpiece used as a medical or dental cutting or polishing tool, a jewel cutting or polishing tool or an industrial cutting or polishing tool.

In a conventional handpiece, a head case houses a hollow rotating shaft, a bar stopper rotatably mounted inside the rear end portion of the rotating shaft, a bar checker fixed inside the front end portion of the rotating shaft, and a coil spring clamp member one end of which is fixed to the bar stopper and the other end of which is fixed to the bar checker.

A clamp member of this type is opened when one of the rotating shaft and the bar stopper is fixed and the other thereof is rotated against the torsional force of the clamp member so as to apply force on both ends of the clamp member. When the force acting on one of the rotating shaft and the bar stopper is removed, the clamp member is closed by its torsional force. When the clamp member is opened by a clamp member opening means, this clamp member opening means must have a member for fixing one of the rotating shaft and the bar stopper to the head case, and a member for rotating the other thereof in a direction opposite to the winding direction of the clamp member. However, according to the method in which only one of the rotating shaft and the bar stopper is rotated, the rotational angle of the rotating shaft or the bar stopper is increased, and a drive mechanism for the rotating shaft or the bar stopper becomes large in size. The clamp member opening means cannot be housed inside the head case. For this reason, the handpiece is separated from the clamp member opening means, and the opening operation of the clamp member becomes complicated when a cutting tool or the like is mounted in or detached from the handpiece, resulting in inconvenience.

SUMMARY OF THE INVENTION

It is an object of the present invention to provide a spring chuck having a clamp member opening means for providing a large torsional angle of a clamp member even if a rotating shaft and a bar stopper are rotated through a small angle by a drive mechanism.

In order to achieve the above object of the present invention, when a push member serving as a drive mechanism of a rotating shaft and a bar stopper is pushed to rotate the rotating shaft and the bar stopper in opposite directions, both ends of the clamp member are applied with force to open the clamp member. Even if a displacement of the push member is small, the torsional angle of the clamp member becomes large. As a result, the clamp member opening means as a whole becomes small and can be housed in the head case.

BRIEF DESCRIPTION OF THE DRAWINGS

FIG. 2 is a disassembled view of the spring chuck shown in FIG. 1;

FIG. 3 is a partially sectional view when the spring chuck of FIG. 2 is assembled in the head case;

It should be noted that the same reference numerals denote the same parts throughout the drawings.

DESCRIPTION OF THE PREFERRED EMBODIMENTS

Figure 1:
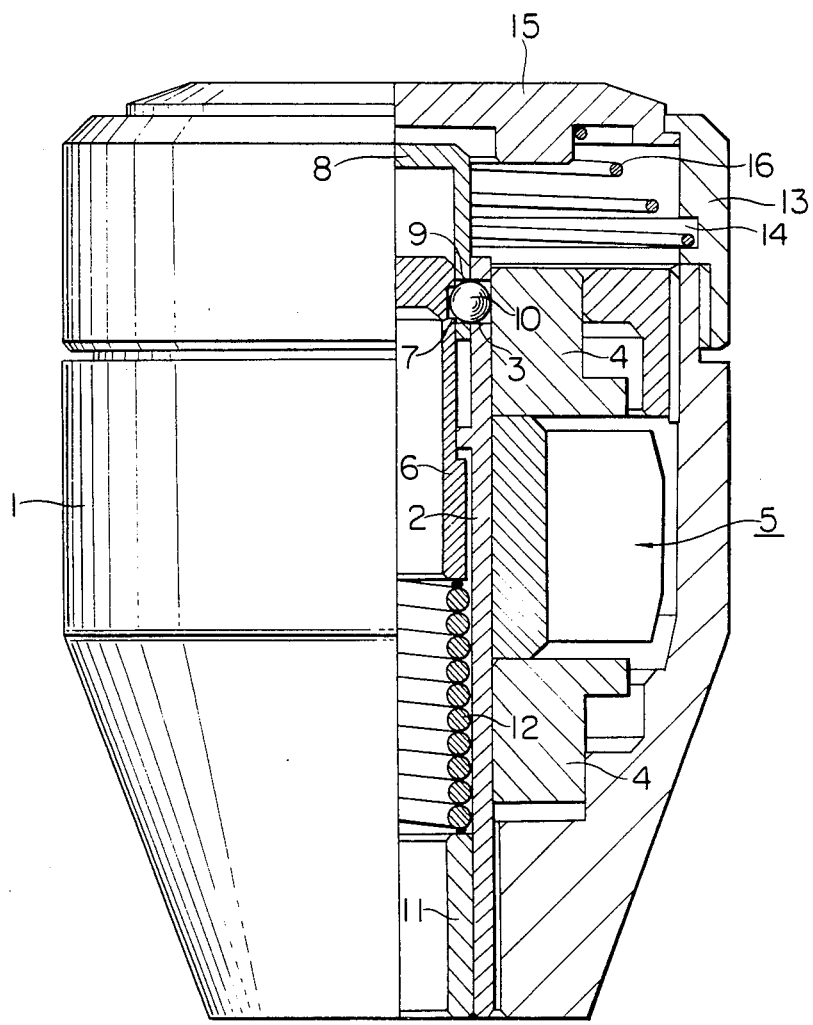
FIG. 1 is a half sectional view of a head case having a spring chuck according to an embodiment of the present invention.

FIGS. 1 to 3 show an embodiment of the present invention. Reference numeral 1 denotes a head case integrally formed at the front end of a shank (not shown) of a handpiece; 2, a cylindrical rotating shaft having an inclined guide groove 3 at the rear end portion thereof. The right end of the guide groove 3 is higher than the left end thereof (See FIG. 2). The rotating shaft 2 is pivotally mounted in the head case 1 through a bearing 4. Reference numeral 5 denotes an impeller having a plurality of blades which extend substantially radially. The impeller 5 is fixed at an intermediate portion of the rotating shaft 2. When compressed air is jetted against the impeller blades, the impeller 5 is rotated together with the rotating shaft 2. Reference numeral 6 denotes a cylindrical bar stopper having a bottom. The bar stopper 6 has an inclined guide groove 7. Unlike the inclination direction of the guide groove 3 of the rotating shaft 2, the right end of the guide groove 7 is lower than the left end thereof (See FIG. 2). The bar stopper 6 is rotatably mounted inside the rear end portion of the rotating shaft 2. Reference numeral 8 denotes a cylindrical push member having a bottom and a holding hole 9 at the front end portion thereof (See FIG. 2). The push member 8 is axially movable between the rotating shaft 2 and the bar stopper 6. Reference numeral 10 denotes a ball which is held in the holding hole 9, an outer portion of which is engaged with the guide groove 3 of the rotating shaft 2 and an inner portion of which is engaged with the guide groove 7 of the bar stopper 6; 11, a bar checker secured to the inside wall of the front end of the rotating shaft 2; 12, a coil spring clamp member, one end of which is fixed to the bar stopper 6 and the other end of which is fixed to the bar checker 11 by any suitable means such as welding or the like; and 13, a cap nut having a spring holding groove 14 formed in an inner wall surface along the circumferential direction thereof. The cap nut 13 is screwed around the upper end portion of the head case 1. Reference numeral 15 denotes an upper cover which is held by the cap nut 13 to be vertically movable; and 16, a spring disposed between the spring holding groove 14 in the cap nut 13 and the upper cover 15. The upper cover 15 is biased upward in the figures by the biasing force of the spring 16 so as to bring the outer edge of the upper cover 15 into tight contact with the inner edge of the cap nut 13.

In the embodiment having the construction described above, the guide groove 3 in the rotating shaft 2, the guide groove 7 in the bar stopper 6, the push member 8, the holding hole 9 in the push member 8 and the ball 10 held in the holding hole 9 constitute a clamp member opening means. When the upper cover 15 is moved downward in the figures against the biasing force of the spring 16 to bring the upper cover 15 into tight contact with the push member 8 and when the upper cover 15 together with the push member 8 are moved downward in the figures against the biasing force of the spring 16 and the torsional force of the clamp member 12, the ball 10 held in the holding hole 9 in the push member 8 is pushed into a position between the inclined surfaces of the guide grooves 3 and 7 which cross each other. The ball 10 is thus moved downward in the figures. For this reason, the rotating shaft 2 is rotated counterclockwise, and the bar stopper 6 is rotated clockwise, so that both ends of the clamp member 12 are pushed. The inner diameter of the clamp member 12 is enlarged, and the chuck is opened. Therefore, a cutting tool or the like can be inserted in or removed from the rotating shaft 2.

When the force is removed from the upper cover 15, the rotating shaft 2 and the bar stopper 6 are respectively rotated clockwise and counterclockwise by the torsional force of the clamp member 12. For this reason, the ball 10 is moved upward by the inclined surfaces of the guide grooves 3 and 7 which cross each other, so that the push member 8 is moved upward to the initial position. Along with this upward movement, the inner diameter of the clamp member 12 is contracted (i.e., the chuck is closed), and the cutting tool or the like inserted in the rotating shaft 2 is firmly clamped by the clamp member 12. In this case, the upper cover 15 is moved upward by the biasing force of the spring 16 and is brought into tight contact with the cap nut 13.

Figure 4:
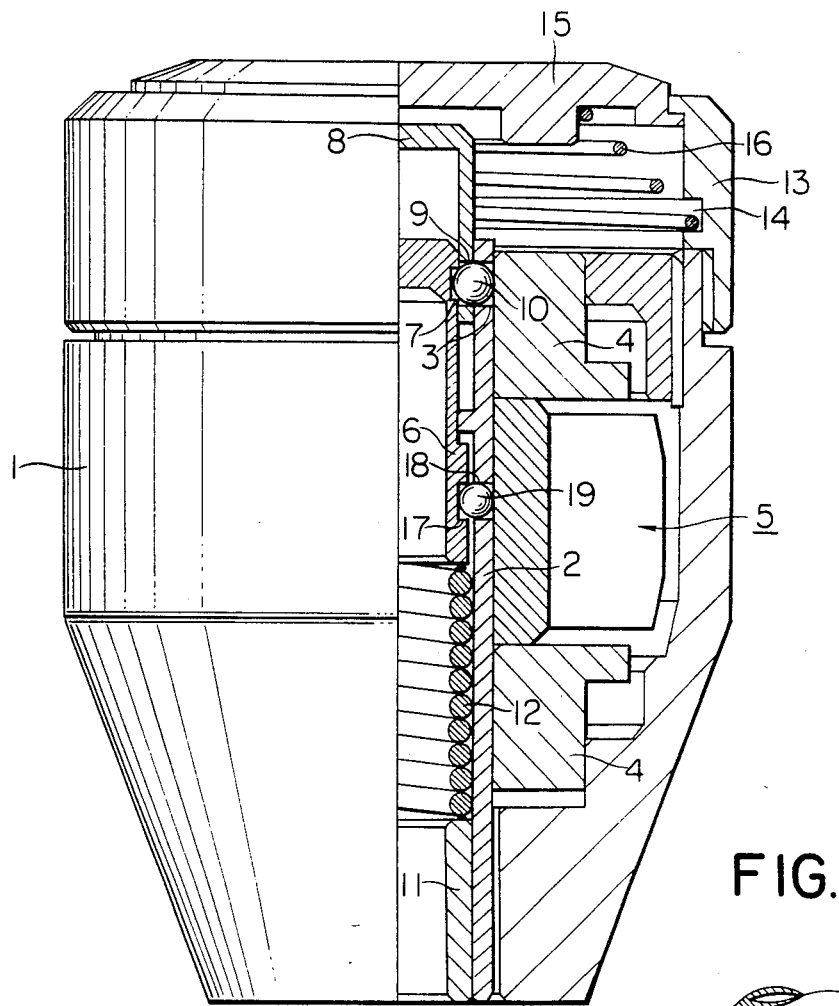
FIG. 4 is a half sectional view of a head case having a spring chuck according to another embodiment of the present invention.
Figure 5:
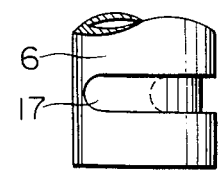
FIG. 5 is a disassembled view of the spring chuck shown in FIG. 4.
Figure 5:
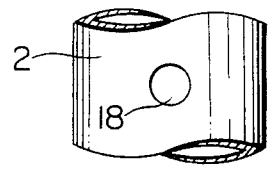

FIGS. 4 and 5 show another embodiment of the present invention. The same reference numerals in FIGS. 4 and 5 denote the same parts as in FIGS. 1 to 3. Reference numeral 17 denotes a guide groove formed in the outer wall surface at the front end of a bar stopper 6 (See FIG. 5); 18, a holding hole formed at an intermediate portion of a rotating shaft 2 (See FIG. 5); and 19, a ball held in the holding hole 18 so as to engage with the guide groove 17 in the bar stopper 6. The guide groove 17, the holding hole 18 and the ball 19 constitute a movement preventing means.

In the second embodiment having the construction described above, in the same manner as in the first embodiment, when an upper cover 15 together with a push member 8 is moved downward in FIG. 4 against the biasing force of a spring 16 and the torsional force of a clamp member 12, the rotating shaft 2 and the bar stopper 6 are respectively rotated counterclockwise and clockwise. Thus, the chuck is opened. A cutting tool or the like can be inserted in or removed from the rotating shaft 2. However, when the force acting on the upper cover 15 is removed, the rotating shaft 2 and the bar stopper 6 are respectively rotated clockwise and counterclockwise by the torsional force of the clamp member 12. Thus, the chuck is closed, and the cutting tool or the like inserted in the rotating shaft 2 can be firmly clamped by the clamp member 12.

When an upward force acts on the cutting tool or the like, while a workpiece is cut by the cutting tool or the like held by the clamp member 12, the bar stopper 6 is moved upward in the first embodiment. The push member 8 is then moved downward. The bar stopper 6 is rotated clockwise and the rotating shaft 2 is rotated counterclockwise, so that the both ends of the clamp member 12 are pushed to open the clamp member 12. For this reason, the clamping force of the clamp member 12 is weakened, and the cutting tool will not rotate. In the worst case, the workpiece cannot be cut. However, according to the second embodiment, even if an upward force acts on the cutting tool or the like in FIG. 4, the ball 19 is engaged with the guide groove 17, so that the bar stopper 6 will not be moved upward in FIG. 4. As a result, the clamp member 12 will not open while the workpiece is being cut.

According to the present invention as described above, when the push member 8 is moved downward, the rotating shaft 2 and the bar stopper 6 are rotated in opposite directions by the clamp member opening means having the guide groove 3 in the rotating shaft 2, the guide groove 7 in the bar stopper 6, the push member 8, the holding hole 9 formed in the push member 8 and the ball 10 held in the holding hole 9 in the push member 8. Therefore, the relative rotation between the rotating shaft 2 and the bar stopper 6 becomes a sum of rotational angles of the rotating shaft 2 and the bar stopper 6. Even if a displacement of the push member 8 is small, the relative rotation between the rotating shaft 2 and the bar stopper 6 becomes large. In other words, when the relative rotation between the rotating shaft 2 and the bar stopper 6 is predetermined, the clamp member opening means can be built into the head case 1 without increasing the dimensions of the head case 1 since the displacement of the upper cover 15 and the push member 8 is small.

What is claimed is:

1. A spring chuck comprising:
a hollow rotating shaft;
a bar stopper rotatably mounted inside a rear end portion of said rotating shaft;
a push member axially movable between said rotating shaft and said bar stopper;
a bar checker fixed inside a front end portion of said rotating shaft;
a coil spring clamp member which opens against a torsional force thereof when a force acts on both ends of said clamp member and closes by the torsional force thereof when the force is removed, one end of which is fixed to said bar stopper and the other end of which is fixed to said bar checker; and
clamp member opening means for rotating said bar stopper and said bar checker in opposite directions when said push member is applied with force.

2. A spring chuck as set forth in claim 1 wherein said clamp member opening means comprises a guide groove formed in said rotating shaft and inclined in one direction; a guide groove formed in an outer wall surface of said bar stopper and inclined in the other direction opposite to said one direction; said push member; a holding hole formed in said push member; and a ball held in said holding hole in said push member, one portion of which is engaged with said guide groove in said rotating shaft and another portion of which is engaged with said guide groove in said bar stopper.

3. A spring chuck comprising:
a hollow rotating shaft;
a bar stopper rotatably mounted inside a rear end portion of said rotating shaft;
a push member axially movable between said rotating shaft and said bar stopper;
a bar checker fixed inside a front end portion of said rotating shaft;
a coil spring clamp member which opens against a torsional force thereof when a force acts on both ends of said clamp member and closes by the torsional force thereof when the force is removed, one end of which is fixed to said bar stopper and the other end of which is fixed to said bar checker;
clamp member opening means for rotating said bar stopper and said bar checker in opposite directions when said push member is applied with force; and movement proventing means for preventing said bar stopper from being moved along an axial direction thereof.

4. A spring chuck as set forth in claim 3 wherein said clamp member opening means comprises a guide groove formed in said rotating shaft and inclined in one direction; a guide groove formed in an outer wall surface of said bar stopper and inclined in the other direction opposite to said one direction; said push member; a holding hole formed in said push member; and a ball held in said holding hole in said push member, one portion of which is engaged with said guide groove in said rotating shaft and another portion of which is engaged with said guide groove in said bar stopper.

5. A spring chuck as set forth in claim 3 wherein said movement preventing means comprises a holding hole formed on a wall surface of said rotating shaft; a guide groove formed in said bar stopper along a circumferential direction thereof; and a ball held in said holding hole in said rotating shaft so as to engage with said guide groove in said bar stopper.

* * * * *